US008325228B2

(12) United States Patent
Mariadoss

(10) Patent No.: US 8,325,228 B2
(45) Date of Patent: Dec. 4, 2012

(54) PERFORMING REAL-TIME ANALYTICS USING A NETWORK PROCESSING SOLUTION ABLE TO DIRECTLY INGEST IP CAMERA VIDEO STREAMS

(75) Inventor: Pandian Mariadoss, Allen, TX (US)

(73) Assignee: International Business Machines Corporation, Armonk, NY (US)

( * ) Notice: Subject to any disclaimer, the term of this patent is extended or adjusted under 35 U.S.C. 154(b) by 1136 days.

(21) Appl. No.: 12/180,431

(22) Filed: Jul. 25, 2008

(65) Prior Publication Data

US 2010/0020172 A1    Jan. 28, 2010

(51) Int. Cl.
 *H04N 7/18* (2006.01)
(52) U.S. Cl. ........................................ 348/143
(58) Field of Classification Search .................... 348/143
 See application file for complete search history.

(56) References Cited

U.S. PATENT DOCUMENTS

| | | | |
|---|---|---|---|
| 6,795,863 | B1 | 9/2004 | Doty, Jr. |
| 6,950,467 | B2 | 9/2005 | Yoo |
| 7,114,174 | B1 | 9/2006 | Brooks et al. |
| 2007/0013776 | A1* | 1/2007 | Venetianer et al. ........... 348/143 |
| 2007/0220165 | A1* | 9/2007 | Moorer et al. ................. 709/231 |

FOREIGN PATENT DOCUMENTS

| | | |
|---|---|---|
| EP | 0645725 A2 | 3/1995 |
| WO | 0072186 A2 | 11/2000 |

OTHER PUBLICATIONS

Taniguchi, Y., et al., "SceneCabinet: A Video Indexing System Integrating Video Analysis Techniques", IEICE Transactions on Information and Systems, Pt. 2, vol. J84-D-2, No. 6, pp. 1112-1121, 2001.
Roli, F., et al., "A Multi-Expert System for Movie Segmentation", Trans. of Inst. of Electronics, Info. and Comm. Engineers D-II, vol. J85D-II, No. 6, pp. 1112-1121, Jun. 2001.
Veloso, E., et al., "A Hierarchical Characterization of a Live Streaming Media Workload", IEEE/ACM Transactions on Networking, vol. 14, No. 1, Feb. 2006.
Girgensohn, A., et al., "Support for Effective Use of Multiple Video Steams in Security", Oct. 27, 2006.

* cited by examiner

*Primary Examiner* — Wing Chan
*Assistant Examiner* — David X Yi
(74) *Attorney, Agent, or Firm* — Patents on Demand P.A.; Brian K. Buchheit; Scott M. Garrett

(57) ABSTRACT

The present invention discloses a solution for an intelligent video surveillance (IVS) system able to perform real-time analytics on internet protocol (IP) video streams which are directly ingested by the IVS system. An internet protocol camera can be identified and connected to the intelligent video surveillance system which lacks an intermediate video management component. The raw video stream can be received directly from the camera in the form of a real-time video stream such as real-time streaming protocol (RTSP). One or more real-time analytics can be performed on said video stream based on one or more system criteria and user established criteria. When an incident event is detected one or more programmatic actions can be performed in response to analytics enacted.

16 Claims, 3 Drawing Sheets

PERFORMING REAL-TIME ANALYTICS USING A NETWORK PROCESSING SOLUTION ABLE TO DIRECTLY INGEST IP CAMERA VIDEO STREAMS

BACKGROUND OF THE INVENTION

The present invention relates to the field of video analytics and, more particularly, to performing real-time analytics using a network processing solution able to directly ingest internet protocol (IP) camera video streams.

Intelligent video surveillance (IVS) plays a pivotal role in managing threats, maintaining safety, and assisting in security. IVS systems provide analytics, alert first responders during an incident event, and provide a deterrent to potential aggressors. Many intelligent video surveillance systems require intermediate systems such as video management systems (VMSs) to organize surveillance artifacts (e.g., cameras, locations, footage, etc). That is, a local VMS is effectively a local hub, which peripheral devices (e.g., video cameras, microphones, surveillance sensors, etc.) connect. Local VMSs can process the received input, can record timed video, and can perform other programmatic tasks.

A number of network solutions (IBM's Smart Surveillance Solution, for example) exist which provide services to enhance capabilities of existing VMSs. These network solutions can integrate data from multiple sensors and analog and digital cameras into one searchable system, can permit searching of data according to a broad range of parameters (e.g., time, date, alert, object, size, location, and color), can share data across agencies, countries and departments, can permit information to be accessed and viewed remotely from a Web browser, can prioritize critical events and store video associated with these events in long term storage, and can analyze footage for perpetrator identification, theft prevention and damage detection, customer behavior, etc.

Conventional network solutions are designed to only interact with VMSs. Many potential customers, however, do not possess a VMS and/or would desire to minimize their video surveillance costs by retiring an existing VMS, if an option existed to receive desired services directly from a network solution provider. For example, many individuals and/or entities desire capabilities of video analytics, which is a capability generally lacking or non-robust in all but the highest end VMSs. It would be beneficial if network solutions providing video processing capabilities, such as analytics, were made more accessible by eliminating the requirement, which often functions as an entry barrier, of possessing a VMS.

BRIEF SUMMARY OF THE INVENTION

The present invention can be implemented in accordance with numerous aspects consistent with the material presented herein. For example, one aspect of the present invention can include a system for performing video analytics. The system can include an intelligent video surveillance system configured to directly ingest video streams from at least one network connected IP camera. The intelligent video surveillance system can be further configured to perform real-time video analytics on the directly ingested video stream. In one embodiment, the system can also include a filter specific to the network connected IP camera that is an application programming interface (API) configured to decode the video steam from the network connected IP camera before conveying the decoding video stream to the intelligent video surveillance system. The real-time video analytics can include face recognition, object tracking, motion detection, and the like.

Another aspect of the present invention can include a method and computer program product for intelligent video surveillance. In this aspect, a raw, real-time time video stream from a remotely located internet protocol camera connected to a network can be identified. The raw real-time video stream can be processed using an application program interface. The processed video stream can be conveyed to an analytics engine. At least one video analytics programmatic action can be performed in real-time against the processed video stream.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

DETAILED DESCRIPTION OF THE INVENTION

Figure 1:
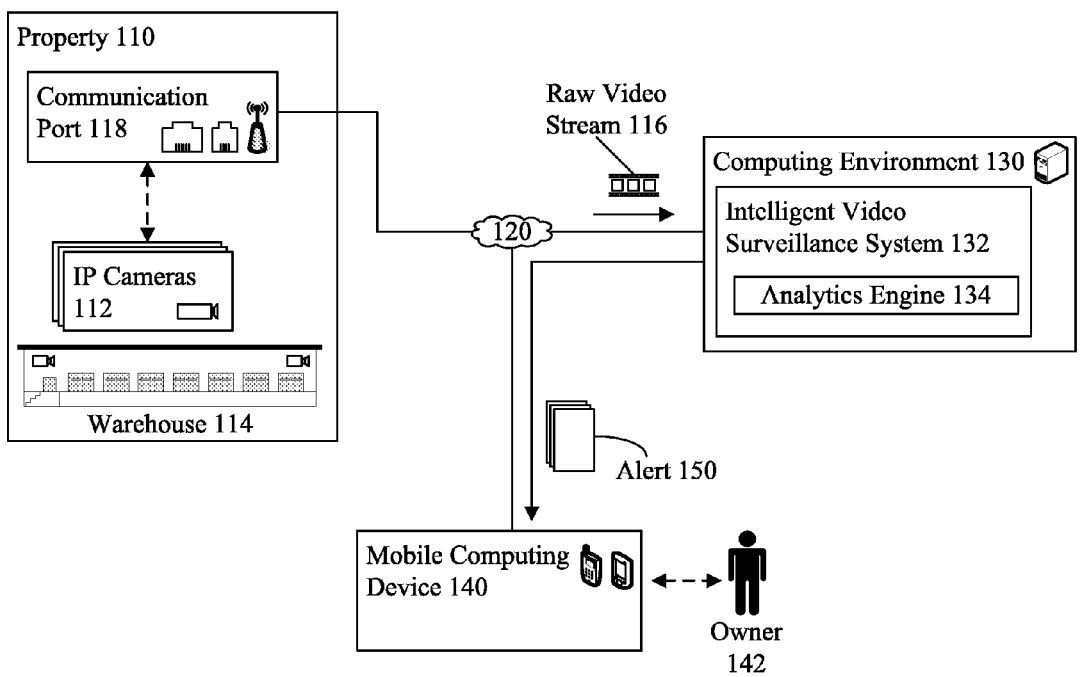
FIG. 1 is a schematic diagram illustrating a set of scenario for directly ingesting raw video streams from internet protocol (IP) cameras and performing real-time analytics on the received video streams in accordance with an embodiment of the inventive arrangements disclosed herein.
Figure 1:
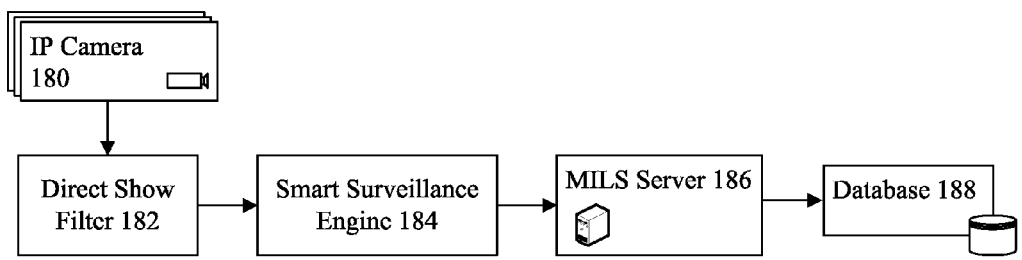

The present invention discloses a solution for performing real-time analytics using input from internet protocol (IP) cameras directly connected to a network, where the analytics are performed by a remotely located network element. In the solution, a network element providing intelligent video surveillance (IVS) services is able to directly interact with raw output of a set of one or ore IP cameras. No video management system (VMS) intermediary is needed or is existent between the IP cameras and the remotely located IVS service provider. The IVS service provider can perform real-time analytics a video stream directly ingested from one or more IP cameras. Real-time analytics performed on the stream can include face recognition, object tracking, motion detection, and the like.

In one embodiment, an owner of an IP camera or an establishment where the IP cameras are deployed can establish user/location specific profile settings. These profile settings can specify thresholds and elements to be examined by analytic processing operations and can establish user specific programmatic actions to be performed based the analytic processing results. Programmatic action can include, for example, notification, alerts, programmatic actions altering a localized system, and the like. Profile settings can be arbitrarily complex which can include multiple IP camera video streams, one or more analytics per stream, and the like.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram illustrating a set of scenario 105, 160 for directly ingesting raw video streams from internet protocol (IP) cameras and performing real-time analytics on the received video streams in accordance with an embodiment of the inventive arrangements disclosed herein. In scenario 105, warehouse 114 owner 142 can utilize a surveillance service to monitor property 110. Service provided by computing environment 130 can include IP cameras 112 directly connected to an intelligent video surveillance (IVS) system 132. Ingested video 116 can be used to surveil property 110 using real-time analytics. When incident events occur, alert 150 can be conveyed to owner 142 via mobile computing device 140. Scenario 160 can represent a contemplated embodiment of scenario 105 unlike prior art where IP cameras 112 are connected indirectly to an IVS system 130 via a video management system. In one embodiment, standard communication protocols can be utilized for communicating between the IP camera 112 and the IVS system 132 and between the IVS system 132 and the mobile computing device 140.

In scenario 105, IP cameras 112 can be connected to intelligent video surveillance system 132 via communication port 118. Communication port 118 can include physical connections such as Ethernet, twisted pair, wireless communication ports, and the like. Physical layer components and network technologies can vary based on camera 112, port 118 and network 120 configurations. Raw video stream 116 can be conveyed from property 110 via network 120 directly to IVS system 132 without being treated by a video management system.

Engine 134 can receive and decode raw video stream 116 prior to performing analytics on stream 116. Default analytics established by computing environment 130 and IVS system 132 can be combined with owner 142 settings to provide customized monitoring for property 110. For instance, to reduce the likelihood of false alerts from facial recognition, owner 142 can provide portrait pictures of authorized personnel for property 110. Analytics engine 134 can be used to detect incident events which can include, motion detection, object tracking, presence detection, and the like.

Mobile computing device 140 can be a portable hardware/software device able to receive alerts 150 and communicate with computing environment 130. Device 140 can include mobile phone, personal digital assistant (PDA), laptop, ultra-mobile computing devices, and the like. The device 140 need not be a portable device, but can be any device (e.g., a personal computer, a home telephone, etc.) able to receive communicated notifications.

Computing environment 130 can include a set of software components able to provide monitoring and analysis functionality. For example, environment 130 can be a JAVA 2 ENTERPRISE EDITION (J2EE) environment 130, such as IBM's WEBSPHERE. Functionality can be embodied as Web services which can include remote control, monitoring, reporting, and the like. Components can include intelligent video surveillance system 132 and analytics engine 134. In one embodiment, IVS system 132 can be implemented within a middleware software platform.

In scenario 160, an IP camera 180 can convey a raw video stream to a smart surveillance engine (SSE) 184. SSE 184 utilizing DIRECT SHOW filter 182 can process the raw video stream received from IP camera 180. DIRECTSHOW filter 182 can be a software application programming interface (API) able to decode Motion Picture Experts Group (MPEG), Motion Joint Photographic Expert Group (M-JPEG), and the like. Decoded video streams can be analyzed in real-time by SSE 184 to provide notifications and alerts to appropriate entities. Middleware for Large Scale Surveillance (MILS) server 168 can provide consolidation, management, and access for video streams processed by SSE 184. In one embodiment, MILS server 168 can be a JAVA 2 ENTERPRISE EDITION (J2EE) software platform. Metadata exported from video streams can be indexing and managed using database 118.

Figure 2:
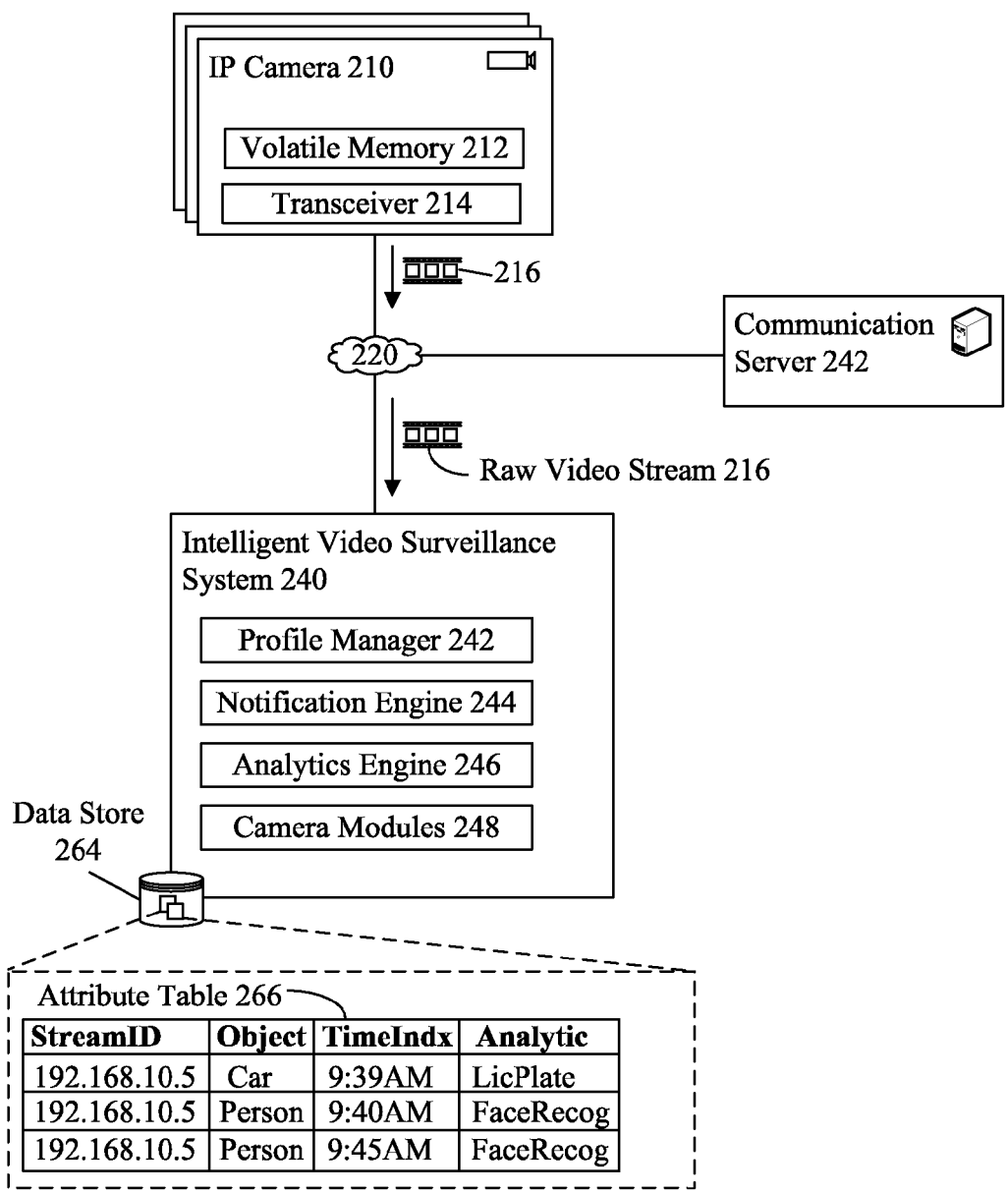
FIG. 2 is a schematic diagram illustrating a system for providing real-time analytics on directly ingested IP camera video streams in accordance with an embodiment of the inventive arrangements disclosed herein.

FIG. 2 is a schematic diagram illustrating a system 200 for providing real-time analytics on directly ingested IP camera video streams in accordance with an embodiment of the inventive arrangements disclosed herein. In system 200, intelligent video surveillance system 240 can provide real-time analysis of video stream 216 provided by directly connected IP camera 210. System 240 determining an incident event (e.g., unattended object) can respond by notifying/alerting associated entities, altering the state of cameras 210 and/or surveillance system 210.

As used herein, IP cameras 210 can include cameras able to convey a video stream to an IVS system using one or more internet protocols. The IVS system 240 can be one or more component systems lacking an intermediate video management system. System 240 can be able to record, monitor, perform real-time analytics, and reporting on IP camera 210 streams. Real-time analytics can encompass real-time and near real-time analysis of video streams.

IP camera 210, which can include volatile memory 212 and transceiver 214, can convey raw video stream 216 to IVS 240. Video information received from camera 210 optics can be temporarily stored in volatile memory 212 prior to transmission. Transmission of video stream 216 to IVS 240 can be facilitated by transceiver 214 which can convey stream 216 via network 220. In one embodiment, raw video stream 216 can include an H.264 MPEG4 encoded video stream.

IVS 240 can receive and process raw video stream 116 to condition the stream for analytics. Processing can be predicated on camera modules 248 which can allow IVS 240 to interface with vendor specific camera configurations. In one embodiment, modules 248 can be a plug-in based framework allowing vendor specific application programming interfaces (APIs) to interoperate with IVS 240. Modules 248 can enable IVS 240 to perform actions such as query camera data, enable remote control of cameras, and the like.

Once processed, video stream 216 can be analyzed and incident events can be identified. Analytics engine 246 can perform one or more examinations of video stream 216. In one embodiment, one or more frames of video stream 216 can be analyzed based on one or more specialized algorithms. Algorithms can include, but is not limited to, face recognition, path tracking, object tracking, motion detection, presence detection, and the like. Extracted data from video stream 216 can be stored in data store 264. Data can include, but is not limited to, attribute data 266, incident information, actions taken in response to incident events, and the like. For instance, attribute table 266 data can be used to index and search processed video streams quickly.

Profile manager 242 can permit user and/or camera specific settings to be maintained for a set of IP cameras 210. For instance, analytics such as object tracking and license plate identification can be enabled for cameras surveilling a loading dock at a warehouse. Manager 242 can be utilized to maintain user notification settings which can vary based on camera, analytics, incident events, and the like.

Notification engine 244 can be used to provide alerts to users, authorities, first responders, and the like. When an incident event occurs, notification engine 244 can communicate messages to one or more user configured devices. Further, engine 244 can be used to manage varying degrees of critical alerts. For instance, when motion is detected in a non-critical area of surveillance, a text exchange message can be delivered to a user notifying of a possible presence.

Communication server 242 can enable IVS 240 to execute one or more communication functions in response to real-time analytics performed. Server 242 can include, but is not limited to, a text exchange server, telephony server, facsimile server, and the like. Although presented as a separate entity communication server 242 functionality can be expressed in IVS system 240.

Figure 3:
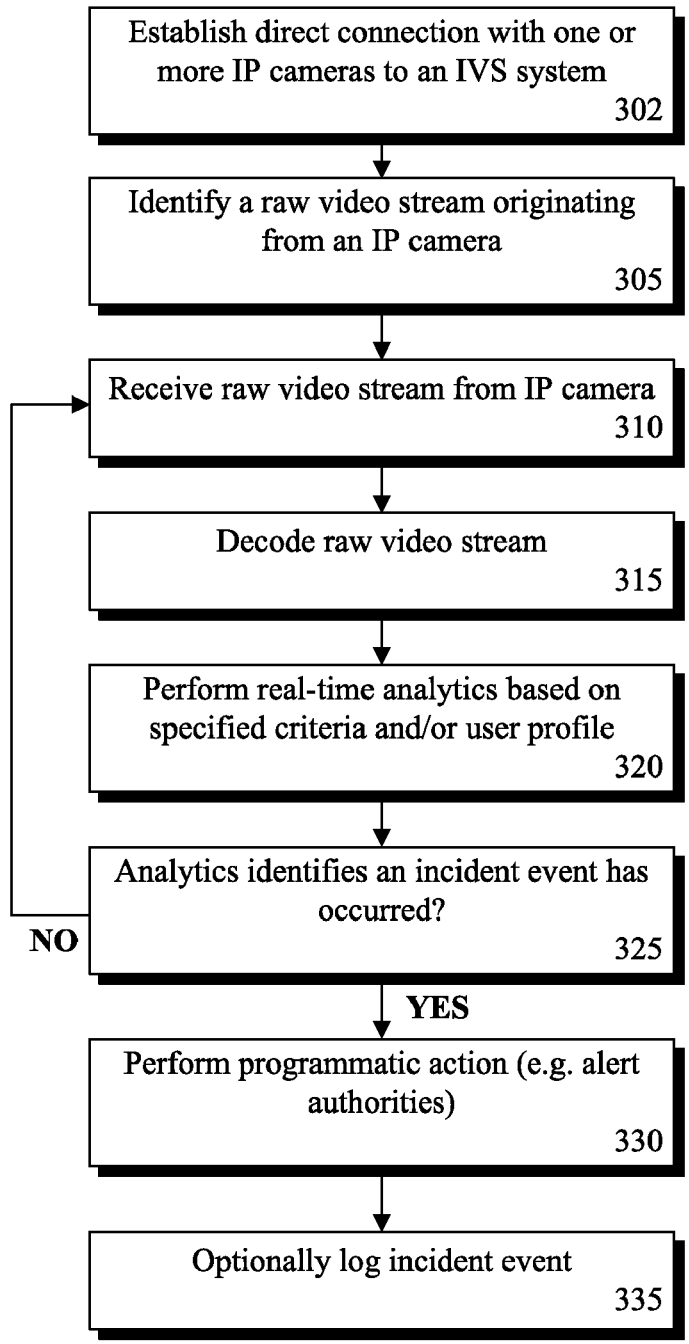
FIG. 3 is a flowchart illustrating a method for executing real-time analytics on directly ingested internet protocol (IP) camera video streams in accordance with an embodiment of the inventive arrangements disclosed herein.

FIG. 3 is a flowchart illustrating a method 300 for executing real-time analytics on directly ingested internet protocol (IP) camera video streams in accordance with an embodiment of the inventive arrangements disclosed herein. Method 300 can be performed in the context of system 200. In method 300, one or more IP cameras can convey video streams directly to an intelligent video surveillance (IVS) system which can initiate real-time analytics on the video streams.

As used herein, IP cameras can include cameras able to convey a video stream to an IVS system using one or more internet protocols. The IVS system can be one or more component systems lacking an intermediate video management system able to record, monitor, perform real-time analytics, and reporting. Real-time analytics can encompass real-time and near real-time analysis of video streams. The analytics, which need not occur in real time, can also be performed after an arbitrary delay.

In step 302, one or more IP cameras can establish a direct connection to an IVS system. In step 305, the IVS system can identify a raw video stream originating from an IP camera. In step 310, the raw video stream from the IP camera can be received. In step 315, the raw video stream can be decoded and processed. In step 320, real-time analytics can be performed on the video stream based on one or more processing criteria and/or user profile settings. Criteria/settings can include, face recognition, path tracking, object tracking, motion detection, and the like. In step 325, if analytics identifies an incident event has occurred, the method can proceed to step 330, else return to step 310. In step 330, a programmatic action can be performed by the IVS system. Actions can include notification and/or alerting appropriate entities, altering a localized system state (e.g., zooming/panning a camera), adjusting analytics, and the like. In step 335, the IVS system can optionally log the incident event in a system log, user history log, and the like.

The diagrams in FIGS. 1-3 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for performing video analytics comprising:
an intelligent video surveillance system, comprising one or more processors for directly ingesting video streams from at least one network connected IP camera, wherein said intelligent video surveillance system is further configured to perform real-time video analytics on the directly ingested video stream;
a filter specific to the network connected IP camera that is an application programming interface (API) configured to decode the video stream from the network connected IP camera before conveying the decoded video stream to the intelligent video surveillance system, wherein the filter specific to the network connected IP camera is configured to receive the video streams from the at least one network connected IP camera over the network, wherein the at least one network connected IP camera comprises a plurality of network connected IP cameras geographically proximate to each other, wherein the intelligent video surveillance system is configured to perform the real time analytics on multiple video streams from different ones of the plurality of network connected IP cameras; and
a software engine, comprising program instructions stored in at least one non-transitory medium, said program instructions able to be executed by at least one processor to perform at least one programmatic action responsive to results produced by an analytics engine that performs the real-time analytics, wherein at least one action that the software engine is configured to perform is a notification action that conveys a notification to a previously designated user when a previously established condition is detected by the analytics engine.

2. The system of claim 1, wherein the real-time video analytics comprise at least one of face recognition, object tracking, and motion detection.

3. The system of claim 1, further comprising: a plurality of camera modules stored on a storage medium, wherein each camera module comprises programmatic instructions permitting the intelligent video surveillance system to interface with a vender specific IP camera.

4. The system of claim 1, wherein the intelligent video surveillance system is configured to convey commands to the at least one network connected IP camera, where the commands result in an IP camera adjustment, which affects an aspect of the video stream captured by the IP camera.

5. The system of claim 1, wherein the intelligent video surveillance system provides at least one Web service that provides the real-time video analytics on the directed ingested video stream.

6. The system of claim 1, further comprising:
a non-transitory storage media configured to store profiles for entities responsible for a geographic region, wherein images of the geographic region are captured within the directly ingested video stream, wherein entity specific configuration settings are included in the stored profiles, wherein the entity specific configuration settings specify conditions to be detected by the analytics engine and a programmatic actions to be automatically performed when the specified conditions are detected, wherein each network connected IP camera is indexed within a database system against a stored profile.

7. A method for intelligent video surveillance comprising:
identifying a raw, real-time video stream from a remotely located internet protocol camera connected to a network;
processing the raw real-time video stream using an application program interface, wherein the processing comprises decoding the raw real-time video stream from the network connected IP camera, and wherein the application program interface is a filter specific to the internet protocol camera;
conveying the processed video stream to an analytics engine, wherein the analytics engine is implemented in a middleware software platform; and
performing at least one video analytics programmatic action against the processed video stream.
comparing a metric extracted from the processed video stream responsive to the video analytics programmatic action against at least one previously established condition;
when comparing results match the metrics and the previously established condition, automatically initiating at least one resulting programmatic action, wherein the at least one previously established condition and the at least one resulting programmatic action are user configurable by an authorized entity, wherein said authorized entity is an entity having responsibility over a region captured within the processed video stream.

8. The method of claim 7, wherein the analytics engine is a component of an intelligent video surveillance system that is unable to process the raw real-time video stream in absence of the application program interface.

9. The method of claim 7, wherein the video analytics programmatic action comprises at least one of face recognition, object tracking, and motion detection.

10. The method of claim 7, wherein said programmatic action is at least one of a notification, an alert, and an action altering the state of a localized entity.

11. The method of claim 7, further comprising:
identifying a different raw, real time video stream from a different remotely located internet protocol camera connected to the network;
processing the different raw, real-time video stream using the application program interface;
conveying the different processed video stream to the analytics engine; and
performing at least one video analytics programmatic action against the processed video stream and the different processed video stream.

12. A computer program product for intelligent video surveillance comprising:
a non-transitory computer usable medium having computer usable program code embodied therewith, the computer usable program code comprising:
computer usable program code configured to identify a raw, real-time video stream from a remotely located internet protocol camera connected to a network;
computer usable program code configured to process the raw real-time video stream using an application program interface, wherein the process comprises decoding the raw real-time video stream from the network connected IP camera, and wherein the application program interface is a filter specific to the internet protocol camera;
computer usable program code configured to convey the processed video stream to an analytics engine, wherein the application program interface is a filter specific to the internet protocol camera, wherein the analytics engine is implemented in a middleware software platform;
computer usable program code configured to perform at least one video analytics programmatic action against the processed video stream,
computer usable program code configured to compare a metric extracted from the processed video stream responsive to the video analytics programmatic action against at least one previously established condition; and
computer usable program code configured to, when comparing results match the metrics and the previously established condition, automatically initiating at least one resulting programmatic action, wherein the at least one previously established condition and the at least one resulting programmatic action are user configurable by an authorized entity, wherein said authorized entity is an entity having responsibility over a region captured within the processed video stream.

13. The computer program product of claim 12, wherein the analytics engine is a component of an intelligent video surveillance system that is unable to process the raw real-time video stream in absence of the application program interface.

14. The system of claim 1, wherein the intelligent video surveillance system is implemented in a middleware software platform.

15. The system of claim 1, further comprising: a Middleware for Large Scale Surveillance (MILS) server to provide consolidation, management, and access for the analyzed video stream processed by the intelligent video surveillance system.

16. The method of claim 7, further comprising:
exporting metadata from the processed video stream; and
indexing the metadata within a database system.

* * * * *